(12) United States Patent
Parker et al.

(10) Patent No.: US 7,252,785 B2
(45) Date of Patent: Aug. 7, 2007

(54) COMPOSITION FOR PRODUCING A THERMAL INSULATION COATING

(75) Inventors: Robert Parker, Mannheim (DE); Norbert Schneider, Altrip (DE); Gerhard Wagenblast, Wachenheim (DE); Arno Boehm, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 260 days.

(21) Appl. No.: 10/518,711

(22) PCT Filed: Jul. 4, 2003

(86) PCT No.: PCT/EP03/07201

§ 371 (c)(1),
(2), (4) Date: Dec. 22, 2004

(87) PCT Pub. No.: WO2004/005427

PCT Pub. Date: Jan. 15, 2004

(65) Prior Publication Data

US 2005/0221091 A1 Oct. 6, 2005

(30) Foreign Application Priority Data

Jul. 5, 2002 (DE) .................................. 102 30 388

(51) Int. Cl.
*C09K 19/52* (2006.01)
*C09K 19/54* (2006.01)
*C03C 17/32* (2006.01)
*G02B 5/30* (2006.01)

(52) U.S. Cl. .................. 252/299.01; 252/299.5; 428/1.1; 428/1.3; 428/1.5; 428/910

(58) Field of Classification Search .......... 252/299.01, 252/299.5; 428/411.1, 910, 1.1, 1.3, 1.5
See application file for complete search history.

(56) References Cited

U.S. PATENT DOCUMENTS

| 5,942,030 | A | 8/1999 | Schuhmacher et al. |
| 6,180,025 | B1 | 1/2001 | Schoenfeld et al. |
| 6,800,337 | B1 * | 10/2004 | Siemensmeyer et al. ..... 428/1.1 |

FOREIGN PATENT DOCUMENTS

| DE | 197 45 647 | 4/1999 |
| EP | 0 727 306 | 8/1996 |
| JP | 04281403 | 10/1992 |
| WO | 99 19267 | 4/1999 |
| WO | 02 076988 | 10/2002 |

OTHER PUBLICATIONS

Baessler, H. et al. "Helical Twisting Power of Steroidal Solutes in Cholesteric Mesophases", Journal of Chemical Physics, vol. 52, No. 2, pp. 631, 633-637 1970.

* cited by examiner

*Primary Examiner*—Shean Wu
(74) *Attorney, Agent, or Firm*—Oblon, Spivak, McClelland, Maier & Neustadt, P.C.

(57) ABSTRACT

The invention relates to a composition for producing a heat-insulating coating comprising at least one radiation-absorbing compound and at least one IR-reflector component, to a heat-insulating coating comprising this oriented, cured composition, and to a process for producing said coating.

11 Claims, No Drawings

COMPOSITION FOR PRODUCING A THERMAL INSULATION COATING

CROSS REFERENCES TO RELATED APPLICATIONS

This application is a national stage application of International Patent Application No. PCT/EP03/07201, filed on Jul. 4, 2003, and claims priority to German Patent Application No. 102 30 388.6, filed on Jul. 5, 2002, both of which are incorporated herein by reference in their entireties.

The present invention relates to a composition for producing a heat-insulating coating comprising at least one radiation-absorbing compound and at least one IR-reflector component, to a heat-insulating coating comprising this oriented, cured composition, and to a process for producing said coating.

The problem of screening against thermal radiation is important in particular in connection with the insulation of residential, office or industrial buildings, in particular in connection with buildings with a generous expanse of windows, but also in connection with means of transport, such as cars and public transport vehicles.

The use of materials which substantially reflect thermal radiation for heat insulation, especially for screening against thermal radiation in the wavelength range between 800 nm and 2000 nm, is known. These materials may be, for example, cholesteric IR-reflecting layers.

When substances exhibiting shape anisotropy are heated, it is possible for liquid-crystalline phases known as mesophases to occur. The individual phases differ in the spatial arrangement of the centers of mass of the molecules, on the one hand, and in the arrangement of the molecules with respect to the longitudinal axes, on the other hand (G. W. Gray, P. A. Winsor, Liquid Crystals and Plastic Crystals, Ellis Horwood Limited, Chichester, 1974).

The nematic liquid-crystalline phase has a parallel orientation of the longitudinal axes of the molecules (one-dimensional ordered state). Provided that the molecules forming the nematic phase are chiral, the result is a chiral nematic (cholesteric) phase in which the longitudinal axes of the molecules form a helical superstructure perpendicular thereto (H. Baessler, Festkörperprobleme XI, 1971). The distance between two imaginary layers in which the orientation of the longitudinal axes of the molecules is the same is known as pitch.

The chiral moiety can either be present in the liquid-crystalline molecule itself or can be added to the nematic phase as a dopant, thereby inducing the chiral nematic phase. This phenomenon was first investigated on cholesterol derivatives (e.g. H. Baessler, M. M. Labes, J. Chem. Phys. 52, 631 (1970)). The pitch and thus the wavelength range of the selectively reflected radiation of a chiral nematic layer can be varied by altering the concentration of a chiral dopant.

The chiral nematic phase has special optical properties: a high optical rotation and a pronounced circular dichroism resulting from selective reflection of circularly polarized light within the chiral nematic layers. Chiral nematic systems of this type have interesting possibilities for practical use.

Transparent heat-insulating coatings are known. For example, EP-A-727306 describes a laminated glass consisting of two glass plates and an interlayer in which ultra-fine particles are dispersed. The interlayer is used for heat-insulating and UV absorption.

JP-A-281403/92 describes a laminate consisting of a transparent plate, a coating which reflects IR radiation over a broad wavelength range, and a cholesteric liquid-crystal wavelength filter which selectively reflects near-IR wavelengths and is highly transparent for visible light. The use of IR-absorbing components is not mentioned.

DE-A-19817069 describes IR-reflecting color compositions consisting of an IR-reflecting cholesteric liquid-crystalline polymer and light-absorbing colorants. Colorants are defined as compounds having an absorption maximum in the range from 350 to 750 nm. The use of IR-absorbing components is not mentioned.

WO-A-99/19267 describes heat-insulating coatings comprising one or more cholesteric IR-reflecting layers. The coating is transparent and colorless. However, effective heat-insulation can only be achieved by using a plurality of cholesteric layers.

It is an object of the present invention to provide an effective, tinted heat-insulating coating which is as thin as possible.

We have found that this object is achieved by a composition for producing a heat-insulating coating, which comprises i) at least one radiation-absorbing tert-alkylphenoxy-substituted polycyclic compound A of the general formula I

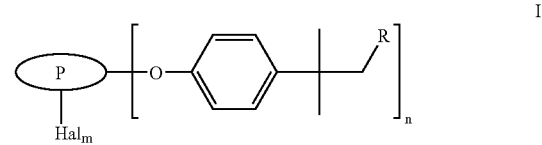

where

P is a conjugated polycyclic radical which is stable to bases and nucleophiles, optionally bears aryl substituents and contains no group from the group consisting of —CO—NH—CO—, —COOH and —CO—O—CO—;

R is $C_1$-$C_8$-alkyl, whose carbon chain may be interrupted by one of more groups selected from the group consisting of —O—, —S—, —NR$^1$—, —CO— and —SO$_2$— and which may be monosubstituted or polysubstituted by identical or different radicals selected from the group consisting of $C_1$-$C_6$-alkoxy and a 5- to 7-membered heterocyclic radical which is attached via a nitrogen atom and may contain further heteroatoms and/or may be aromatic; or R is $C_5$-$C_8$-cycloalkyl, whose carbon framework may be interrupted by one or more groups selected from the group consisting of —O—, —S—, —NR$^1$—, —CO— and —SO$_2$— and which may be monosubstituted or polysubstituted by $C_1$-$C_6$-alkyl;

$R^1$ is hydrogen or $C_1$-$C_6$-alkyl;

Hal is chlorine and/or bromine;

m is from 0 to 15; and n is from 1 to 16, subject to the proviso that the sum m+n is ≦16 and ii) at least one curable IR-reflecting component B which comprises a) at least one achiral nematic polymerizable monomer and at least one chiral polymerizable monomer;

b) at least one cholesteric polymerizable monomer;

c) at least one cholesteric crosslinkable polymer; or d) at least one cholesteric polymer in a polymerizable diluent.

The IR-reflecting property of component B is due to the fact that, after orientating and curing component B, at least part of the oriented cholesteric polymers obtainable by polymerizing the monomers a) or b) or at least part of the oriented polymers c) or d) has a helical superstructure pitch which corresponds to a wavelength in the IR spectral range.

In the context of the present invention, curing means both the polymerization of monomers and the crosslinking of polymers.

Radiation-absorbing compounds A are meant to be those which absorb in the infrared (IR) spectral range, i.e. in the spectral range having a wavelength of from >750 nm to about 1 mm, preferably from 751 nm to about 2000 nm, and/or in the visible spectral range, i.e. in the spectral range having a wavelength of from 350 to 750 nm, preferably from 550 to 750 nm, and/or in the ultraviolet (UV) spectral range, i.e. in the spectral range having a wavelength of from 10 nm to <350 nm, preferably from 100 nm to 349 nm. Preferably, the compounds A absorb in the infrared spectral range, in particular from 751 to 2000 nm, and/or in the visible spectral range, in particular from 550 to 750 nm. Particularly preferably, the compounds A absorb in the infrared spectral range, in particular from 751 to 2000 nm, and in the visible spectral range, in particular from 550 to 750 nm.

The compounds A may be used as pure substances or as mixtures of positional isomers or as mixtures of substances.

The compounds A of formula I are described, for example, in PCT application PCT/EP 02/03279 and are based on a conjugated polycyclic radical P which is stable to bases and nucleophiles under the reaction conditions. In particular, the radical P contains no group from the group consisting of —CO—NH—CO—, —COOH and —CO—O—CO—.

P can bear aryl substituents that are resistant to base attack, for example unsubstituted or alkyl- and/or alkoxy-substituted aryl, especially phenyl, or hetaryl, such as 2-, 3- and 4-pyridyl and pyrimidyl. These aryl substituents can either be attached directly to the ring structure or, in the case of the hereinbelow recited polycyclic imides, to the imide nitrogen atoms.

The tert-alkylphenoxy radical(s) in such aryl-substituted radicals P can also be attached to P via the aryl substituents, for example via the 4- or 3,5-positions of the phenyl radical in the case of diphenyldiketopyrrolopyrrole or N,N'-diphenylperylene-3,4:9,10-tetracarboxylic diimide.

Preferably P is a base-stable radical selected from the group consisting of naphthalenes, anthracenes, phenanthrenes, tetracenes, perylenes, terrylenes, quaterrylenes, pentarylenes and hexarylenes, anthraquinones, indanthrones, N-substituted naphthalene-1,8-dicarboxylic monoimides (hereinafter referred to as naphthalmonoimides for short), N,N'-disubstituted naphthalene-1,8:4,5-tetracarboxylic diimides (naphthalimides for short), N-substituted perylene-3,4-dicarboxylic monoimides (perylmonoimides for short), N,N'-disubstituted perylene-3,4:9,10-tetracarboxylic diimides (perylimides for short), N,N'-disubstituted terrylene-3,4:11,12-tetracarboxylic diimides (terrylimides for short), N,N'-disubstituted quaterrylene-3,4:13,14-tetracarboxylic diimides (quaterrylimides for short), acridines, carbazoles, dibenzofurans, dinaphthofurans, benzimidazoles, benzthiazoles, phenazines, dioxazines, quinacridones, metal phthalocyanines, metal naphthalocyanines, metal porphyrins, cumarins, dibenzofuranones, dinaphthofuranones, benzimidazolones, indigo compounds, thioindigo compounds, quinophthalones, naphthoquinophthalones and diketopyrrolopyrroles.

Particular preference is given to P from the group consisting of naphthalenes, quinacridones, diketopyrrolopyrroles, dioxazines, indanthrones, metal phthalocyanines, metal naphthalocyanines, naphthalmonoimides, perylmonoimides, perylimides, terrylimides and quaterrylimides, and the metal phthalocyanines, metal naphthalocyanines, metal porphyrins, terrylimides and quaterrylimides are very particularly preferred. From these, the quaterrylimides are especially preferred.

The tert-alkylphenoxy radicals characterizing the compounds I and also any halogen atoms present in addition may be attached directly or, as described above, via any aryl substituents to the ring structure of the radicals P. It will be appreciated that both forms of attachment can occur in one and the same compound I. Larger radicals P, such as perylmonoimides, perylimides, terrylimides and quaterrylimides, bear the tert-alkylphenoxy radicals preferably directly on the ring structure or have at least directly attached tert-alkylphenoxy radicals in addition to arylene-attached tert-alkylphenoxy radicals.

Depending on the size of the conjugated ring system, the compounds I contain from at least 1 to 16 (n: 1 to 16), in particular from 2 to 8, tert-alkylphenoxy radicals.

Generally suitable and prefered ranges for m+n will now be mentioned by way of example for particularly preferred radicals P: naphthalene: 1-4, in particular 1-2; quinacridones: 1-8, in particular 2-4; diketopyrrolopyrroles: 1-6, in particular 2-4; dioxazines: 1-8, in particular 2-4; indanthrones: 1-6, in particular 2-4; metal phthalocyanines: 1-16, in particular 4-8; metal naphthalocyanines: 1-16, in particular 8-16; naphthalmonoimides: 1-4, in particular 1-2; perylmonoimides: 1-6, in particular 1-3; perylimides: 1-8, in particular 2-6; terrylimides: 1-12, in particular 2-8; quaterrylimides: 1-14, in particular 2-8.

When the radicals P contain additional aryl substituents not used for attaching tert-alkylphenoxy radicals, the maximum for the sum m+n decreases accordingly.

The tert-alkylphenoxy radicals and any Hal substituents are preferably randomly distributed across the radical P.

Suitable examples of the radicals R and $R^1$ of the formula I and for their substituents will now be recited:

$C_1$-$C_6$-alkyl is, for example, methyl, ethyl, propyl, isopropyl, butyl, isobutyl, sec-butyl, tert-butyl, pentyl, isopentyl, neopentyl, tert-pentyl, hexyl and 2-methylpentyl. In addition to these radicals, $C_1$-$C_8$-alkyl is, for example, heptyl, 1-ethylpentyl, octyl, 2-ethylhexyl and isooctyl.

$C_1$-$C_8$-alkyl whose carbon chain may be interrupted by one or more groups —O— is, for example, 2-methoxyethyl, 2-ethoxyethyl, 2-propoxyethyl, 2-isopropoxyethyl, 2-butoxyethyl, 2- and 3-methoxypropyl, 2- and 3-ethoxypropyl, 2- and 3-propoxypropyl, 2- and 3-butoxypropyl, 2- and 4-methoxybutyl, 2- and 4-ethoxybutyl, 2- and 4-propoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 2- and 4-butoxybutyl, 4,8-dioxadecyl, 3,6,9-trioxadecyl and 3,6,9-trioxaundecyl.

$C_1$-$C_8$-alkyl whose carbon chain may be interrupted by one or more groups —S— is, for example, 2-methylthioethyl, 2-ethylthioethyl, 2-propylthioethyl, 2-isopropylthioethyl, 2-butylthioethyl, 2- and 3-methylthiopropyl, 2- and 3-ethylthiopropyl, 2- and 3-propylthiopropyl, 2- and 3-butylthiopropyl, 2- and 4-methylthiobutyl, 2- and 4-ethylthiobutyl, 2- and 4-propylthiobutyl, 3,6-dithiaheptyl, 3,6-dithiaoctyl, 4,8-dithianonyl, 3,7-dithiaoctyl, 3,7-dithianonyl, 4,7-dithiaoctyl, 4,7-dithianonyl, 2- and 4-butylthiobutyl, 4,8-dithiadecyl, 3,6,9-trithiadecyl and 3,6,9-trithiaundecyl.

$C_1$-$C_8$-alkyl whose carbon chain may be interrupted by one or more groups —$NR^1$— is, for example, 2-monomethyl- and 2-monoethylaminoethyl, 2-dimethylaminoethyl, 2- and 3-dimethylaminopropyl, 3-monoisopropylaminopropyl, 2- and 4-monopropylaminobutyl, 2- and 4-monomethylaminobutyl, 6-methyl-3,6-diazaheptyl, 3,6-dimethyl-3,6-diazaheyptyl, 3,6-diazaoctyl, 3,6-dimethyl-3,6-diazaoctyl, 9-methyl-3,6,9-triazadecyl, 3,6,9-trimethyl-3,6,9-triazadecyl, 3,6,9-triazaundecyl and 3,6,9-trimethyl-3,6,9-triazaundecyl.

$C_1$-$C_8$-alkyl whose carbon chain may be interrupted by one or more groups —CO— is, for example, propan-2-on-1-yl, butan-3-on-1-yl, butan-3-on-2-yl and 2-ethylpentan-3-on-1-yl.

$C_1$-$C_8$-alkyl whose carbon chain may be interrupted by one or more groups —$SO_2$— is, for example, 2-methylsulfonylethyl, 2-ethylsulfonylethyl, 2-propylsulfonylethyl, 2-isopropylsulfonylethyl, 2-butylsulfonylethyl, 2- and 3-methylsulfonylpropyl, 2- and 3-ethylsulfonylpropyl, 2- and 3-propylsulfonylpropyl, 2- and 3-butylsulfonylpropyl, 2- and 4-methylsulfonylbutyl, 2- and 4-ethylsulfonylbutyl, 2- and 4-propylsulfonylbutyl and 4-butylsulfonylbutyl.

$C_1$-$C_6$-alkoxy is, for example, methoxy, ethoxy, propoxy, isopropoxy, butoxy, isobutoxy, sec-butoxy, tert-butoxy, pentoxy, isopentoxy, neopentoxy, tert-pentoxy and hexoxy.

The 5- to 7-membered heterocyclic radical which is attached via a nitrogen atom and may contain further heteroatoms and/or may be aromatic, is, for example, pyrrole, pyrazole, imidazole, triazole, pyrrolidine, pyrazoline, pyrazolidine, imidazoline, imidazolidine, pyridine, pyridazine, pyrimidine, pyrazine, triazine, piperidine, piperazine, oxazole, isooxazole, thiazole, isothiazole, indole, quinoline, isoquinoline or quinaldine.

$C_5$-$C_8$-cycloalkyl, whose carbon framework may be interrupted by one or more groups selected from the group consisting of —O—, —S—, $NR^{1-}$, —CO— and —$SO_2$— and which may be monosubstituted or polysubstituted by $C_1$-$C_6$-alkyl, is, for example, cyclopentyl, 2- and 3-methylcyclopentyl, 2- and 3-ethylcyclopentyl, cyclohexyl, 2-, 3- and 4-methylcyclohexyl, 2-, 3- and 4-ethylcyclohexyl, 3- and 4-propylcyclohexyl, 3- and 4-isopropylcyclohexyl, 3- and 4-butylcyclohexyl, 3- and 4-sec-butylcyclohexyl, 3- and 4-tert-butylcyclohexyl, cycloheptyl, 2-, 3- and 4-methylcycloheptyl, 2-, 3- and 4-ethylcycloheptyl, 3- and 4-propylcycloheptyl, 3- and 4-isopropylcycloheptyl, 3- and 4-butylcycloheptyl, 3- and 4-sec-butylcycloheptyl, 3- and 4-tert-butylcycloheptyl, cyclooctyl, 2-, 3-, 4- and 5-methylcyclooctyl, 2-, 3-, 4- and 5-ethylcyclooctyl, 3-, 4- and 5-propylcyclooctyl, 2-dioxanyl, 4-morpholinyl, 2- and 3-tetrahydrofuryl, 1-, 2- and 3-pyrrolidinyl and 1-, 2-, 3- and 4-piperidyl.

Examples of preferred tert-alkylphenoxy radicals are p-(1,1-dimethylpropyl)phenoxy, p-(1,1-dimethylbutyl)phenoxy, p-(1,1-dimethylpentyl)phenoxy, p-(1,1,3,3-tetramethylbutyl)phenoxy, p-(2-cyclopentyl-1,1-dimethylethyl)phenoxy, p-(2-cyclohexyl-1,1-dimethylethyl)phenoxy, p-(2-cycloheptyl-1,1-dimethylethyl)phenoxy and p-(1,1-dimethyl-2-(4-morpholinyl) ethyl)phenoxy. Particular preference is given to p-(1,1,3,3-tetramethylbutyl)phenoxy.

The particularly preferred naphthalmonoimides, perylmonoimides, perylimides, terrylimides and quaterrylimides bear in particular the following base-stable substituents $R^2$ on the imide nitrogen atoms:

$C_1$-$C_{30}$-alkyl, whose carbon chain may be interrupted by one or more groups selected from —O—, —S—, $NR^1$—, —CO— and —$SO_2$—, and which may be monosubstituted or polysubstituted by identical or different radicals selected from $C_1$-$C_6$-alkoxy and a 5- to 7-membered heterocyclic radical which is attached via a nitrogen atom and may contain further heteroatoms and/or may be aromatic;

$C_5$-$C_8$-cycloalkyl, whose carbon framework may be interrupted by one or more groups selected from the group consisting of —O—, —S—, —$NR^1$—, —CO— and —$SO_2$—, and which may be monosubstituted or polysubstituted by $C_1$-$C_6$-alkyl;

aryl or heteroaryl, such as phenyl, naphthyl, anthracenyl, phenantrenyl, pyrrolyl, pyrazolyl, imidazolyl, oxazolyl, thiazolyl, pyridinyl, pyridazinyl, pyrimidinyl, pyrazinyl, indolyl, quinolinyl, isoquinolinyl or quinaldinyl, where each of these radicals may be monosubstituted or polysubstituted by $C_1$-$C_{18}$-alkyl, $C_1$-$C_6$-alkoxy, cyano, —CONH—$R^1$ and/or —NH—$COR^1$.

The following radicals may be specifically mentioned by way of example for these substituents in addition to the radicals already mentioned:

in addition to the abovementioned alkyl radicals, $C_1$-$C_{30}$-alkyl is, for example, nonyl, isononyl, decyl, isodecyl, undecyl, dodecyl, tridecyl, isotridecyl, tetradecyl, pentadecyl, hexadecyl, heptadecyl, octadecyl, nonadecyl and eicosyl (the designations isononyl, isodecyl and isotridecyl as well as the abovementioned designation isooctyl are trivial names derived from the alcohols obtained by the oxo process);

$C_1$-$C_{30}$-alkyl interrupted by the group —O— or —S— is, for example, 3,6,9-trioxadodecyl, 3,6,9,12-tetraoxatridecyl and 3,6,9,12-tetraoxatetradecyl; 3,6,9-trithiadodecyl, 3,6,9,12-tetrathiatridecyl and 3,6,9,12-tetrathiatetradecyl;

the substituents —CO—$NHR^1$ and —NH—$COR^1$ are, for example, carbamoyl, methylaminocarbonyl, ethylaminocarbonyl, propylaminocarbonyl, butylaminocarbonyl, pentylaminocarbonyl, hexylaminocarbonyl, heptylaminocarbonyl, octylaminocarbonyl, nonylaminocarbonyl and decylaminocarbonyl; formylamino, acetylamino and propionylamino;

aryl or heteroaryl which may be monosubstituted or polysubstituted by $C_1$-$C_{18}$-alkyl, $C_1$-$C_6$-alkoxy, cyano, —CONH—$R^1$ and/or —NH—$COR^1$ is, for example, 2-, 3- and 4-methylphenyl, 2,4-, 2,5-, 3,5- and 2,6-dimethylphenyl, 2,4,6-trimethylphenyl, 2-, 3- and 4-ethylphenyl, 2,4-, 2,5-, 3,5- and 2,6-diethylphenyl, 2,4,6-triethylphenyl, 2-, 3- and 4-propylphenyl, 2,4-, 2,5-, 3,5- and 2,6-dipropylphenyl, 2,4,6-tripropylphenyl, 2-, 3- and 4-isopropylphenyl, 2,4-, 2,5-, 3,5- and 2,6-diisopropylphenyl, 2,4,6-triisopropylphenyl, 2-, 3- and 4-butylphenyl, 2,4-, 2,5-, 3,5- and 2,6-dibutylphenyl, 2,4,6-tributylphenyl, 2-, 3- and 4-isobutylphenyl, 2,4-, 2,5-, 3,5- and 2,6-diisobutylphenyl, 2,4,6-triisobutylphenyl, 2-, 3- and 4-sec-butylphenyl, 2,4-, 2,5-, 3,5- and 2,6-di-sec-butylphenyl, 2,4,6-tri-sec-butylphenyl, 2-, 3- and 4-tert-butylphenyl, 2,4-, 2,5-, 3,5- and 2,6-di-tert-butylphenyl and 2,4,6-tri-tert-butylphenyl; 2-, 3- and 4-methoxyphenyl, 2,4-, 2,5-, 3,5- and 2,6-dimethoxyphenyl, 2,4,6-trimethoxyphenyl, 2-, 3- and 4-ethoxyphenyl, 2,4-, 2,5-, 3,5- and 2,6-diethoxyphenyl, 2,4,6-triethoxyphenyl, 2-, 3- and 4-propoxyphenyl, 2,4-, 2,5-, 3,5- and 2,6-dipropoxyphenyl, 2-, 3- and 4-isopropoxyphenyl, 2,4-, 2,5-, 3,5- and 2,6-diisopropoxyphenyl and 2-, 3- and 4-butoxyphenyl; 2-, 3- and 4-cyanophenyl; 3- and 4-carboxamidophenyl, 3- and 4-N-(methyl)carboxamidophenyl and 3- and 4-N-(ethyl)carboxamidophenyl; 3- and 4-acetylaminophenyl, 3- and 4-propionylaminophenyl and 3- and 4-butyrylaminophenyl.

Particularly preferred compounds A are those in which P is an N,N'-disubstituted quaterrylene-3,4:13,14-tetracarboxylic diimide of formula II

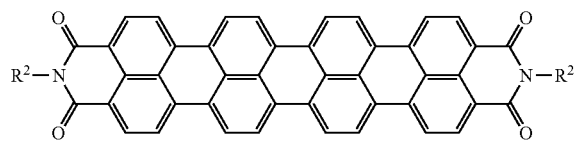

(II)

where $R^2$ is identical to the abovementioned, base-stable imidonitrogen atom substituents.

In particularly preferred compounds A of formula I in which P is a quaterrylimide II, R is preferably H, methyl, ethyl, propyl, isopropyl, butyl, tert-butyl, cyclopentyl, cyclohexyl, cycloheptyl or morpholinyl, particularly preferably H, methyl, ethyl, butyl or tert-butyl and especially tert-butyl;

$R^2$ is preferably substituted phenyl, particularly preferably phenyl substituted by from one to three $C_1$-$C_4$-alkyl radicals and especially 2,6-diisopropylphenyl;

n is preferably from 2 to 10, particularly preferably from 4 to 8 and especially 6; and m is preferably from 0 to 4, particularly preferably from 0 to 2 and in particular 0.

The n tert-alkylphenoxy substituents and the m Hal substituents are preferably randomly distributed across the quaterrylene system. It is particularly preferred for the same number of substituents to be present on the two sides of an imaginary axis between the two imide nitrogen atoms.

The compounds of the formula I can be prepared by a process, which comprises reacting a halide of the general formula III

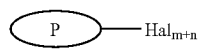

III in an inert basic nitrogen-containing solvent and in the presence of a base with a tert-alkylphenol of the general formula IV

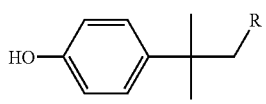

IV

Useful inert basic nitrogen-containing solvents are in particular polar solvents, especially nitrogen-containing heterocycles, such as pyridine, pyrimidine, quinoline, isoquinoline, quinaldine and preferably N-methylpyrrolidone, and also carboxamides, such as N,N-dimethylformamide and N,N-dimethylacetamide.

The solvent quantity depends on the solubility of the halide III and is usually in the range from 2 to 40 g, preferably from 4 to 25 g, of solvent per g of halide III.

Useful bases are in particular non-nucleophilic or only weakly nucleophilic compounds. Examples of such bases are alkali metal hydroxides, such as potassium hydroxide and sodium hydroxide, alkali metal carbonates, such as potassium carbonate and sodium carbonate, and alkali metal alkoxides of tertiary alcohols, such as lithium tert-butoxide, sodium tert-butoxide and potassium tert-butoxide, which are used in anhydrous form.

In general, from 0.8 to 1.5, preferably from 1.0 to 1.2, molar equivalents of base are used per mole of halogen atom to be substituted.

The halides III used as starting materials are generally known or obtainable according to known methods by reacting the unhalogenated conjugated polycyclic compounds with halogenating agents, in particular the elemental halogens. Halides III which contain halogen atoms attached to aryl substituents are known to be generally obtainable by introduction of the halogenated aryl radicals into the polycyclic system.

The molar ratio of halide III to phenol IV depends on the number of halogen atoms to be substituted. In general, from 1 to 2, preferably from 1 to 1.3, mol of phenol IV is used per mole of halogen atom to be replaced in halide III.

The reaction temperature is usually in the range from 50 to 200° C., preferably from 60 to 140° C.

It is advisable for the reaction to be carried out under protective gas, for example nitrogen or argon.

The reaction time depends on the reactivity of the halide III and is about 2-48 h.

Varying the reaction conditions—amount of phenol IV and base and the reaction temperature—advantageously provides control over the halogen replacement, so that it is no problem to prepare not only products I in which all the halogen atoms have been replaced (m=0) but also products I which still contain halogen. If desired, the halogen can subsequently be removed from the product I. Thus, a single starting material III can be used to prepare various products I as desired.

For component B, preferable monomers from the group a) are described in WO 99/19267 and in German patent application P 10203938.0, the full content of which is incorporated herein by reference. The achiral nematic polymerizable monomer from group a) is preferably difunctionally polymerizable and preferably corresponds to the general formula V $$Z^1\text{-}(Y^1\text{-}A^1)_v\text{-}Y^2\text{-}M\text{-}Y^3\text{-}(A^2\text{-}Y^4)_w\text{-}Z^2 \qquad (V)$$

where $Z^1$ and $Z^2$ are identical or different reactive groups via which a polymerization can take place, or radicals which contain such reactive groups, the reactive groups being C=C double bonds, C≡C triple bonds, or oxirane, thiirane, azirane, cyanate, thiocyanate, isocyanate, carboxyl, hydroxyl or amino groups, C=C double bonds being particularly preferred;

$Y^1$, $Y^2$, $Y^3$ and $Y^4$ are each, independently of one another, a chemical bond, O, S, —CO—O—, —O—CO—, —O—CO—O—, —CO—S—, —S—CO—, —CO—N($R^3$)—, —N($R^3$)—CO—, —N($R^3$)—CO—O—, —O—CO—N($R^3$)—, —N($R^3$)—CO—N($R^3$)—, —CH$_2$—O—, —O—CH$_2$—, preferably —CO—O—, —O—CO— or —O—CO—O—, $R^3$ being hydrogen or $C_1$-$C_4$-alkyl;

$A^1$ and $A^2$ are identical or different spacers, for example linear $C_2$-$C_{30}$-alkylene groups, preferably $C_2$-$C_{12}$-alkylene groups, which may be interrupted by oxygen, sulfur or unsubstituted or monosubstituted nitrogen, where these interrupting groups may not be adjacent; suitable amine substituents comprising $C_1$-$C_4$-alkyl groups, where the alkylene chains may be substituted by fluorine, chlorine, bromine, cyano, methyl or ethyl; and where $A^1$ and $A^2$ are particularly preferably —$(CH_2)$—$_n$ where n=2 to 6;

v and w are 0 or 1;

M is a mesogenic group which is preferably of the general formula VI:

$$(T-Y^5)_m\text{-}T \qquad (VI)$$

where

T represents identical or different divalent isocycloaliphatic, heterocycloaliphatic, isoaromatic or heteroaromatic radicals, preferably 1,4-bonded unsubstituted or mono- to polysubstituted, for example mono- to tetrasubstituted, benzene rings,

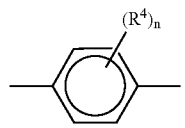

where $R^4$ is fluorine, chlorine, bromine, $C_1$-$C_{20}$-alkyl, $C_1$-$C_{20}$-alkoxy, $C_1$-$C_{20}$-alkylcarbonyl, $C_1$-$C_{20}$-alkylcarbonyloxy, hydroxyl, nitro, CHO or CN, preferably chlorine, bromine or $C_1$-$C_4$-alkyl and in particular methyl; and n is an integer from 0 to 4, preferably from 0 to 2, in particular 0 or 1;

$Y^5$ are identical or different bridge members —CO—O—, —O—CO—, —$CH_2$—O—, —O—$CH_2$—, —CO—S—, —S—CO—, —$CH_2$—S—, —S—$CH_2$, —CH=N— or —N=CH— or a direct bond, preferably —CO—O— or —O—CO—, and m is an integer from 0 to 3, preferably 0, 1 or 2.

The mesogenic group preferably contains a substituted 1,4-dioxybenzene building block, in particular a methyl-substituted 1,4-dioxybenzene building block.

Particularly preferred mesogenic groups have the following structures VII:

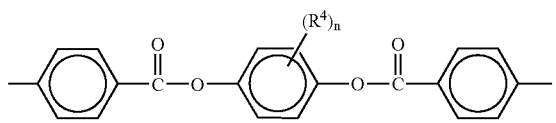

where $R^4$ is fluorine, chlorine, bromine, $C_1$-$C_{20}$-alkyl, $C_1$-$C_{20}$-alkoxy, $C_1$-$C_{20}$-alkylcarbonyl, $C_1$-$C_{20}$-alkylcarbonyloxy, hydroxyl, nitro, CHO or CN and n is an integer from 0 to 4.

In the mesogenic group VII, $R^4$ is particularly preferably chlorine, bromine or $C_1$-$C_4$-alkyl, in particular methyl, and n is from 0 to 2, in particular 0 or 1, especially 1.

Very particularly preferred mesogenic groups have the following structure VIII:

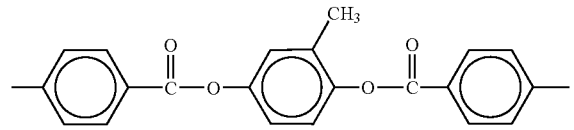

The chiral polymerizable monomer from group a) is preferably of formula IX $$[(Z^1\text{-}Y^1)_o\text{-}A^3\text{-}Y^2\text{-}M\text{-}Y^3]_n X[Y^3\text{-}M\text{-}Y^2\text{-}A^4\text{-}(Y^1\text{-}Z^1)_p]_m \qquad (IX)$$

where $Z^1$, $Y^1$, $Y^2$, $Y^3$ and M are as defined above, o, p are 0 or 1, subject to the proviso that o and p may not both be 0, $A^3$ and $A^4$ are identical or different and $A^3$ is as defined for $A^1$ if o=1 or is a linear $C_2$-$C_{30}$-alkylene group, preferably $C_2$-$C_{12}$-alkylene group which may be interrupted by oxygen, sulfur or unsubstituted or monosubstituted nitrogen, where these interrupting groups may not be adjacent; suitable amine substituents comprising $C_1$-$C_4$-alkyl groups which may be substituted by fluorine, chlorine, bromine, cyano, methyl or ethyl and where $A^3$ is particularly preferably $CH_3$–$(CH_2)_l$ groups where l=1 to 7, if o=0;

$A^4$ is as defined for $A^1$ if p=1 or is a linear $C_2$-$C_{30}$-alkyl group, preferably $C_2$-$C_{12}$-alkyl group which may be interrupted by oxygen, sulfur or unsubstituted or monosubstituted nitrogen, where these interrupting groups may not be adjacent; suitable amine substituents comprising $C_1$-$C_4$-alkyl groups which may be substituted by fluorine, chlorine, bromine, cyano, methyl or ethyl and where $A^3$ is particularly preferably $CH_3$–$(CH_2)_l$ groups where l=1 to 7, if p=0;

n and m are 0, 1 or 2, the sum n+m being equal to 1 or 2, preferably 2; and

X is a chiral radical.

Of the chiral radicals X of the compounds of the general formula IX particular preference is given, not least on account of their easier availability, to those derived from sugars, dinaphthyl or diphenyl derivatives and optically active glycols, alcohols or amino acids. In the case of sugars, particular mention should be made of pentoses and hexoses and derivatives thereof.

Examples of radicals X are the following structures, the terminal lines in each case denoting the free valencies.

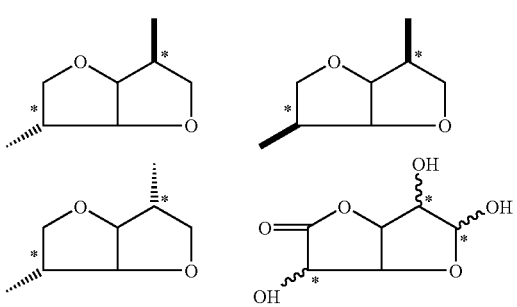

-continued
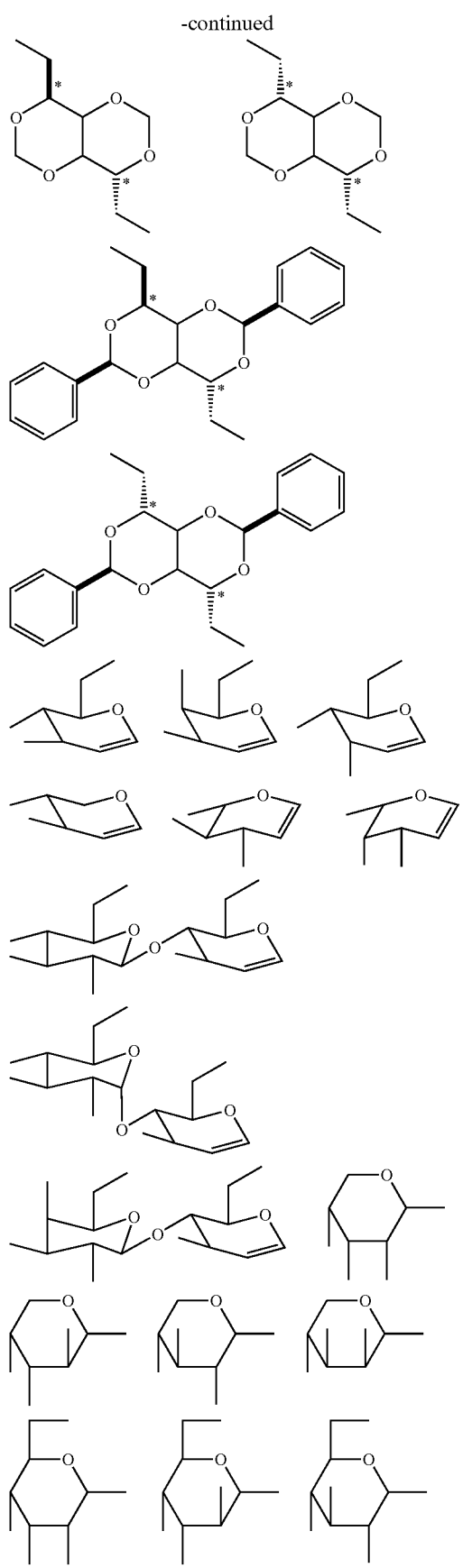
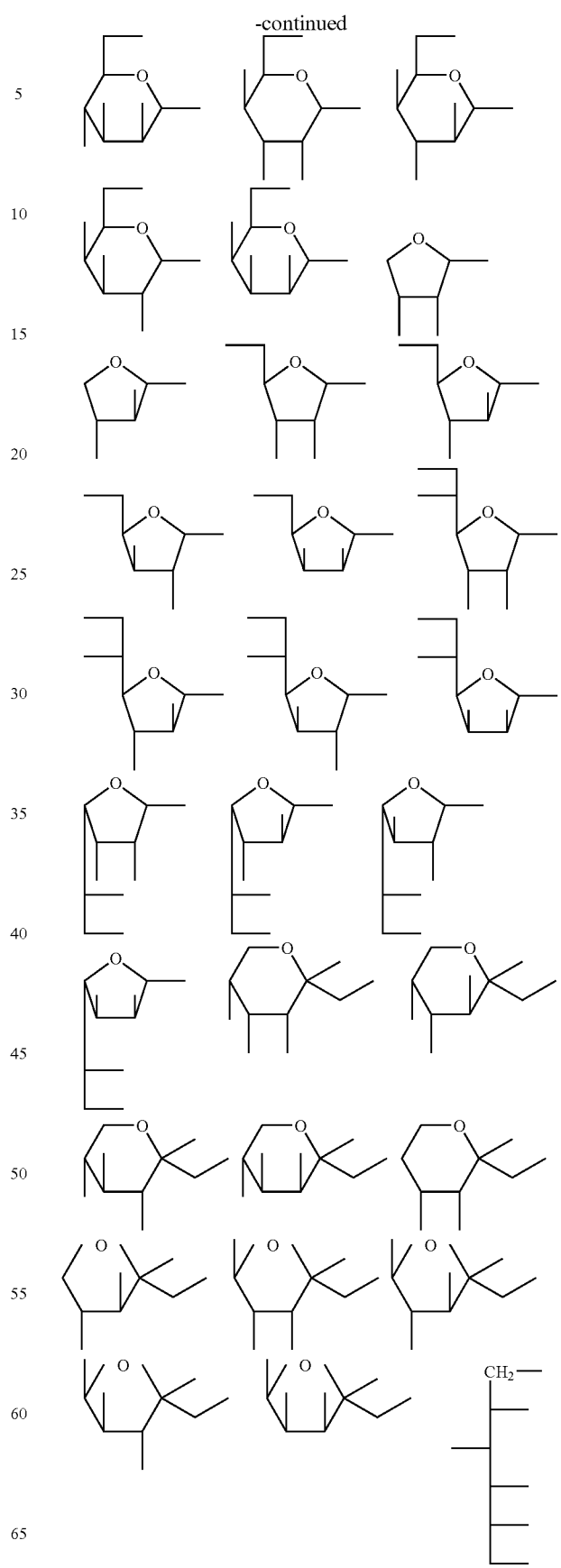

-continued

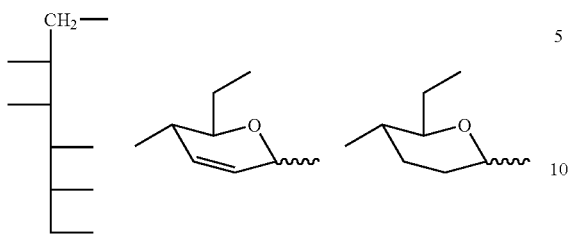
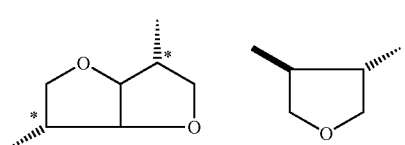

Also suitable are chiral groups which have the following structures:

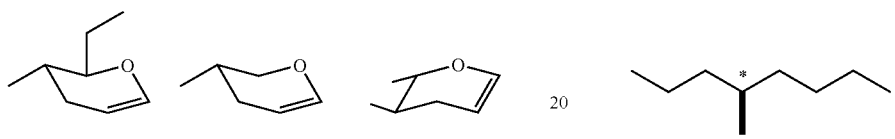

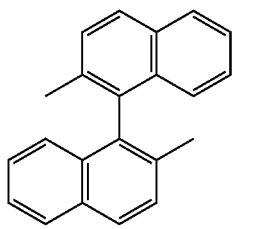

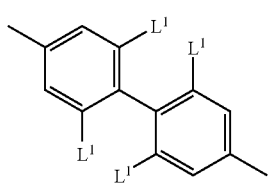

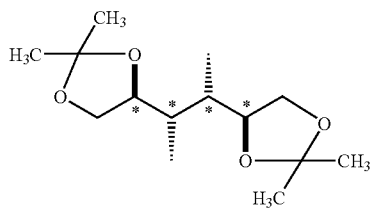

where
L$^1$ is C$_1$-C$_4$-alkyl, C$_1$-C$_4$-alkoxy, halogen, COOR$^5$, OCOR$^5$, NHCOR$^5$ and R$^5$ is C$_1$-C$_4$-alkyl or hydrogen.

Particular preference is given to

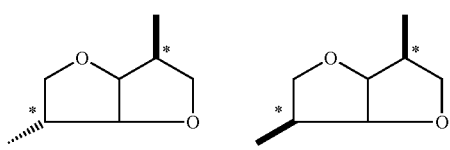

In the above definition of the groups A$^1$, A$^2$, A$^3$, A$^4$, R$^3$, R$^4$, R$^5$ and L$^1$, C$_1$-C$_{20}$-alkyl is in particular methyl, ethyl, n-propyl, isopropyl, n-butyl, sec-butyl, isobutyl, tert-butyl, pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl;

C$_1$-C$_4$-alkyl is in particular methyl, ethyl, n-propyl, isopropyl, n-butyl, sec-butyl, isobutyl or tert-butyl;

C$_1$-C$_{20}$-alkoxy is in particular alkoxy whose alkyl radical corresponds to the abovementioned C$_1$-C$_{20}$-alkyl groups; and C$_2$-C$_{30}$-alkylene is in particular alkylene which correspond to the bivalent radical of the abovementioned C$_2$-C$_{20}$-alkyl groups, or is a linear C$_{21}$-C$_{30}$-homolog.

In a particular embodiment, the nematic achiral polymerizable monomer has the following structural formula X

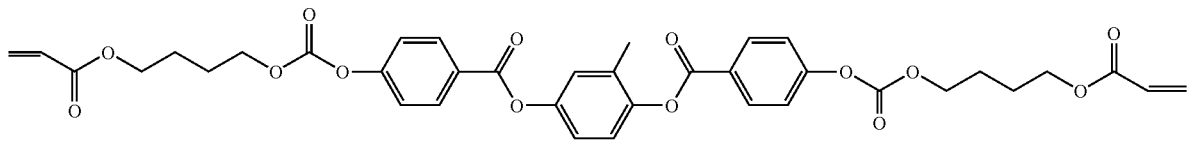

(X)

In a further particular embodiment, the chiral polymerizable monomer has the following structural formula XI or XII

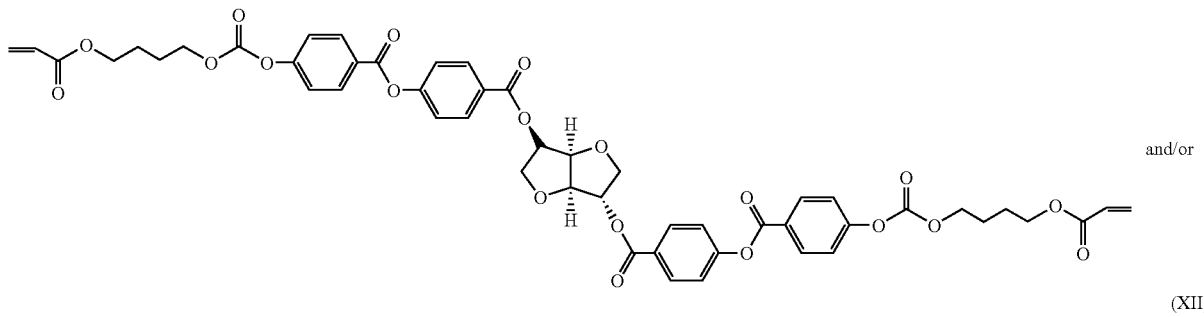

(XI)

and/or

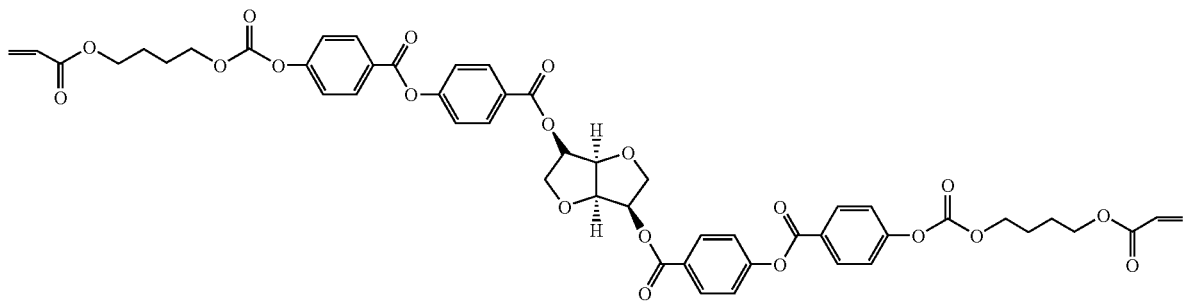

(XII)

The proportion of achiral nematic monomer to chiral monomer is selected such that the polymer resulting from these monomers, following orientation, has a helical superstructure pitch which corresponds to a wavelength in the IR spectral range. The proportion depends on the type of nematic and chiral monomers and must be determined for each individual case.

Alternatively, at least one cholesteric polymerizable monomer of group b) can be used as component B.

Preferred monomers of group b) are described in DE-A 19602848, the true content of which is incorporated herein by reference. In particular, the monomers b) comprise at least one cholesteric polymerizable monomer of the formula XIII $$(Z^1-Y^1-A^1-Y^2-M^1-Y^3)_nX \qquad (XIII)$$

The variables are as defined for the monomers of group a). The preferred embodiments apply correspondingly.

Alternatively, at least one cholesteric crosslinkable polymer of group c) may be used as component B.

Preferred polymers of group c) are cholesteric cellulose derivatives as described in DE-A-197 136 38, in particular cholesteric mixed esters of (1) hydroxyalkyl ethers of cellulose with
(2) saturated, aliphatic or aromatic carboxylic acids and
(3) unsaturated mono- or dicarboxylic acids.

Particular preference is given to mixed esters in which the hydroxyalkyl radicals of component (1) that are attached via ether functions comprise straight-chain or branched $C_2$-$C_{10}$-hydroxyalkyl radicals, in particular hydroxypropyl and/or hydroxyethyl radicals. Component (1) of the suitable mixed esters preferably has a molecular weight of from about 500 to about 1 million. Preferably, the anhydroglucose units of the cellulose are etherified with hydroxyalkyl radicals in an average molar degree of substitution of from 2 to 4. The hydroxyalkyl group in the cellulose can be identical or different. Up to 50% of them can also be replaced by alkyl groups (in particular $C_1$-$C_{10}$-alkyl groups). One example of such a compound is hydroxypropylmethylcellulose.

Compounds which can be used as component (2) of the suitable mixed esters are straight-chain aliphatic $C_1$-$C_{10}$-carboxylic acids, in particular $C_2$-$C_6$-carboxylic acids, branched aliphatic $C_4$-$C_{10}$-carboxylic acids, in particular $C_4$-$C_6$-carboxylic acids or straight-chain or branched halo-carboxylic acids. Component (2) can also comprise benzoic acid or aliphatic carboxylic acids bearing aromatic substituents, in particular phenylacetic acid. Particularly preferably, component (2) is selected from acetic, propionic, n-butyric, isobutyric and n-valeric acid, in particular from propionic, 3-chloropropionic, n-butyric and isobutyric acid.

Component (3) is preferably selected from unsaturated $C_3$-$C_{12}$-mono- or dicarboxylic acids or monoesters of such a dicarboxylic acid, in particular α,β-ethylenically unsaturated $C_3$-$C_6$-mono- or dicarboxylic acids or monoesters of the dicarboxylic acids.

Particularly preferably, component (3) of the suitable mixed esters is selected from acrylic, methacrylic, crotonic, vinylacetic, maleic, fumaric and undecenoic acid, especially from acrylic and methacrylic acid.

Component (1) is preferably esterified with component (2) and (3) in an average molar degree of substitution of from 1.5 to 3, in particular from 1.6 to 2.7, particularly preferably from 2.3 to 2.6. Preferably about 1 to 30%, in particular from 1 to 20% or 1 to 10%, particularly preferably from about 5 to 7%, of the OH groups of component (1) are esterified with component (3).

The proportion of component (2) to component (3) determines the reflection wavelength of the polymer.

Suitable polymers of group c) are furthermore the propargyl-terminated cholesteric polyesters or polycarbonates described in DE-A-197 17 371.

Among these compounds, preference is given to polyesters or polycarbonates having at least one terminal propargyl group of the formula $R^6C\equiv C-CH_2-$, where $R^6$ is H, $C_1$-$C_4$-alkyl, aryl or Ar—$C_1$-$C_4$-alkyl (for example benzyl or phenethyl) which is attached to the polyesters or polycarbonates directly or via a linker. The linker is preferably selected from

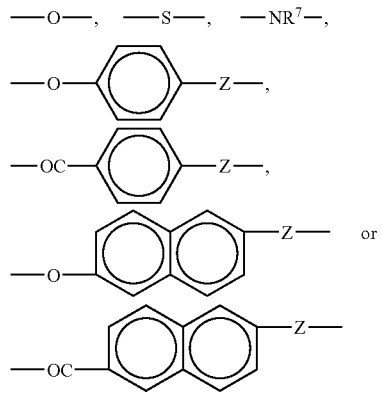

(the propargyl group is attached to Z), where $R^7$ is H, $C_1$-$C_4$-alkyl or phenyl, Z is O, S or $NR^8$, and $R^8$ is H, $C_1$-$C_4$-alkyl or phenyl.

In the polyesters, the terminal propargyl group is preferably attached via

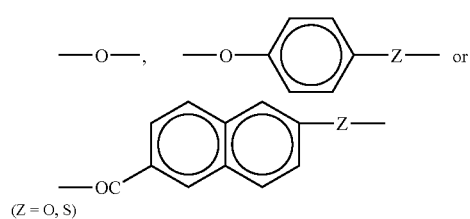

The polyesters preferably comprise
(4) at least one aromatic or araliphatic dicarboxylic acid unit and/or at least one aromatic or araliphatic hydroxycarboxylic acid unit and
(5) at least one diol unit.

Preferred dicarboxylic acid units are those of the formula

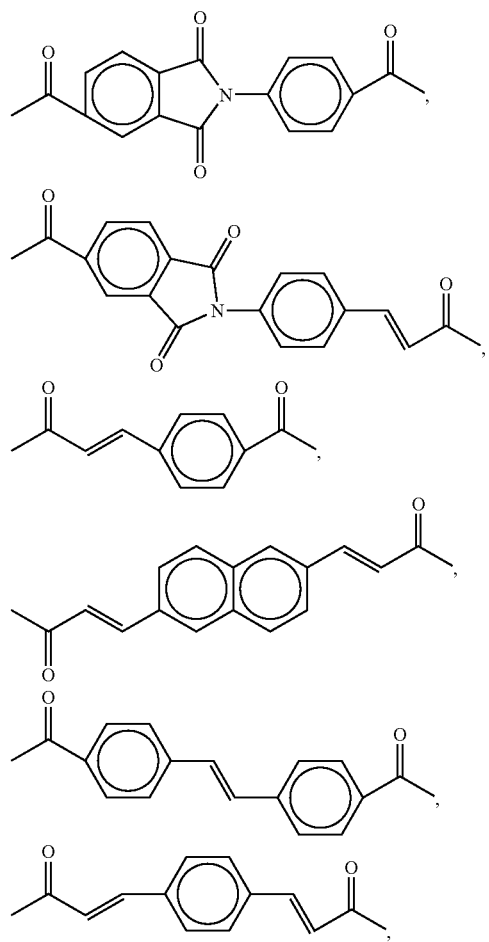

in particular those of the formula

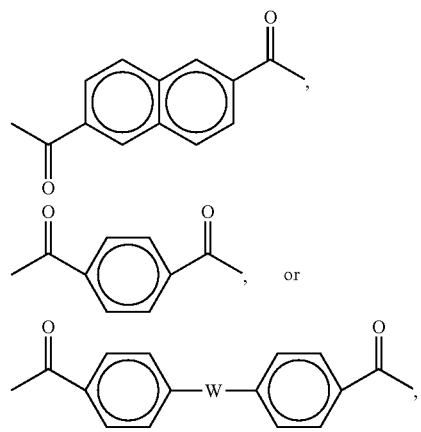

where each of the phenyl groups or the naphthyl group may contain 1, 2 or 3 substituents selected independently of one another from the group consisting Of $C_1$-$C_4$-alkyl, $C_1$-$C_4$-alkoxy, halogen and phenyl, and where, in the above formulae W is $NR^9$, S, O, $(CH_2)_rO(CH_2)_q$, $(CH_2)_s$ or a single bond,
$R^9$ is alkyl or hydrogen,
s is an integer from 1 to 15, and
r and q are each, independently of one another, an integer from 0 to 10.

Preferred hydroxycarboxylic acid units are those of the formula

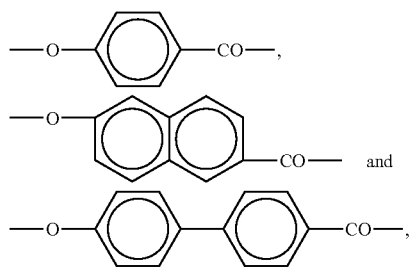

where each phenyl group or the naphthyl group may contain 1, 2 or 3 substituents selected independently of one another from the group consisting of $C_1$-$C_4$-alkyl, $C_1$-$C_4$-alkoxy, halogen and phenyl.

Preferred diol units are those of the formula

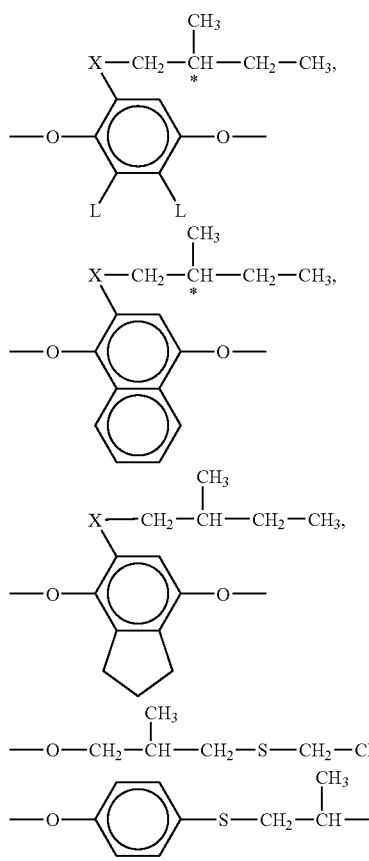

in particular those of the formula

-continued

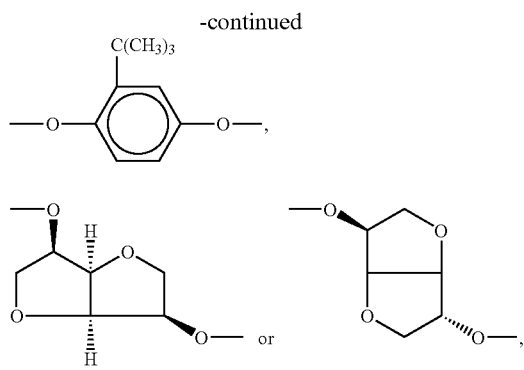

where, in the above formulae

L is alkyl, alkoxy, halogen, $COOR^{11}$, $OCOR^{11}$, $CONHR^{11}$ or $NHCOR^{11}$, X is S, O, N, $CH_2$ or a single bond, A is a single bond, $(CH_2)_n$, $O(CH_2)_n$, $S(CH_2)_n$, $NR^{11}(CH_2)_n$,

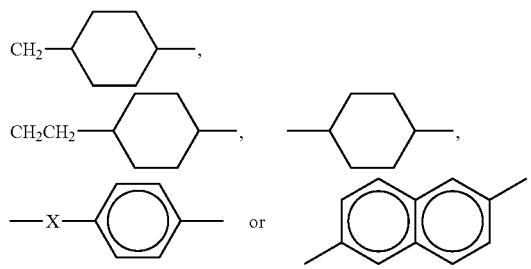

$R^{11}$ is alkyl or hydrogen, $R^{10}$ is hydrogen, halogen, alkyl or phenyl, and n is an integer from 1 to 15.

Preference is given to polyesters comprising at least one dicarboxylic acid unit of the formula

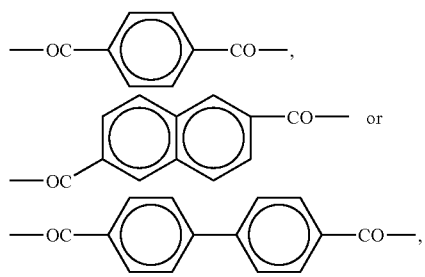

and at least one diol unit of the formula

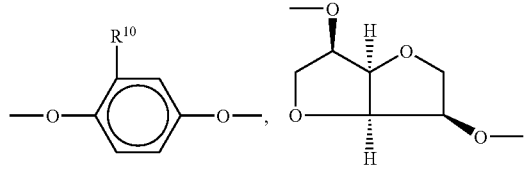

-continued

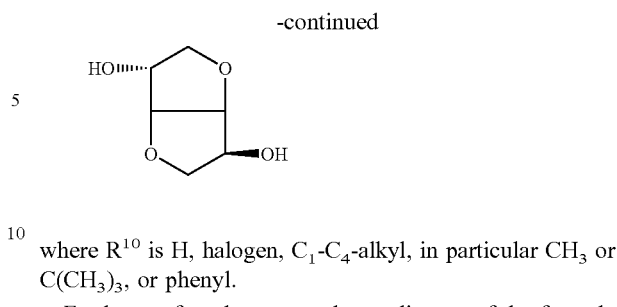

where $R^{10}$ is H, halogen, $C_1$-$C_4$-alkyl, in particular $CH_3$ or $C(CH_3)_3$, or phenyl.

Further preferred compounds are diesters of the formula P—Y—B—CO—O-A-O—CO—B—Y—P, where P is a terminal propargyl group of the above defined formula, Y is O, S or $NR^{12}$ ($R^{12}$=$C_1$-$C_4$-alkyl), B is

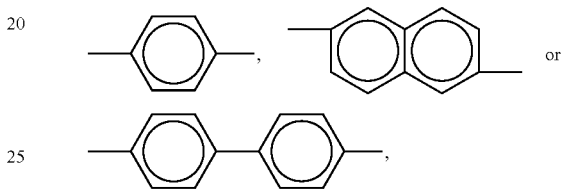

where each phenyl group or the naphthyl group may contain 1, 2 or 3 substituents selected independently of one another from the group consisting of $C_1$-$C_4$-alkyl, $C_1$-$C_4$-alkoxy, halogen or phenyl, and A (together with the adjacent oxygen atoms) is one of the abovementioned diol units.

Particularly preferred diesters are those of the abovementioned formula in which B is

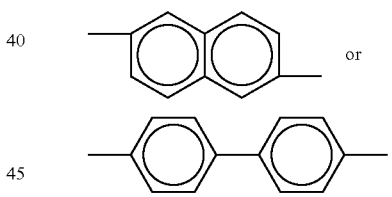

and particular diesters of the formula

HC≡$CCH_2$O—B—CO—O-A-O—CO—B—$OCH_2$—C≡CH, wherein (6)

B is 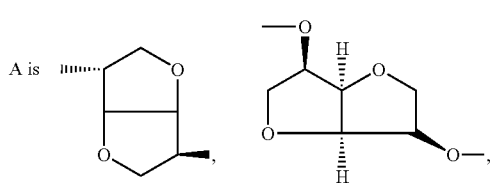 and

A is

-continued

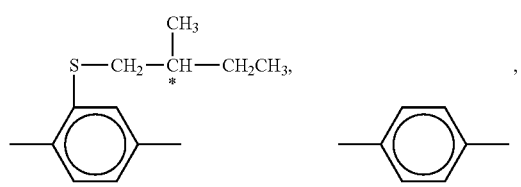

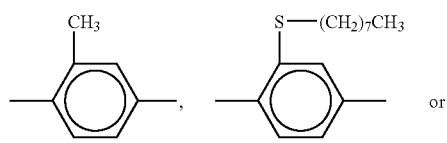

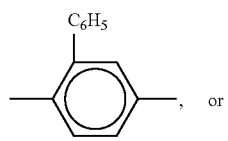

B is 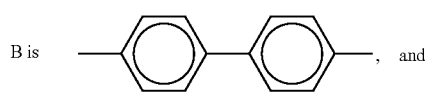, and  (7)

A is as defined for (6).

Further preferred compounds are polycarbonates comprising at least one incorporated diol unit of the abovementioned formulae, in particular of the formulae

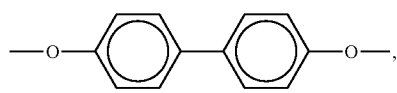

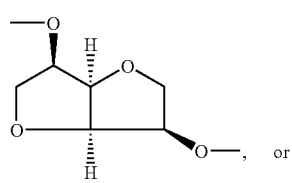

Preference is given here to those polycarbonates which comprise as diol units at least one mesogenic unit of the formula

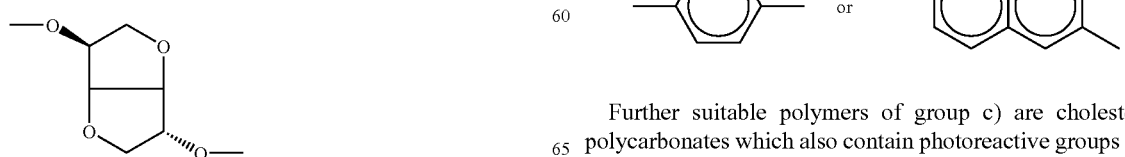

at least one chiral unit of the formula

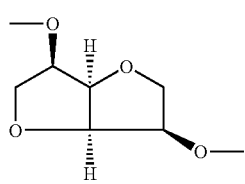

with or without a non-chiral unit of the formula

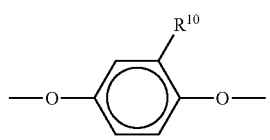

where $R^{10}$ is as defined above and is in particular H or $CH_3$.

Particularly preferred polycarbonates are those having terminal propargyl groups of the formula $HC\equiv CCH_2O-R^{13}-CO$, where $R^{13}$ is Further suitable polymers of group c) are cholesteric polycarbonates which also contain photoreactive groups in a nonterminal position. Such polycarbonates are described in DE-A-196 31 658. They are preferably of the formula XIV

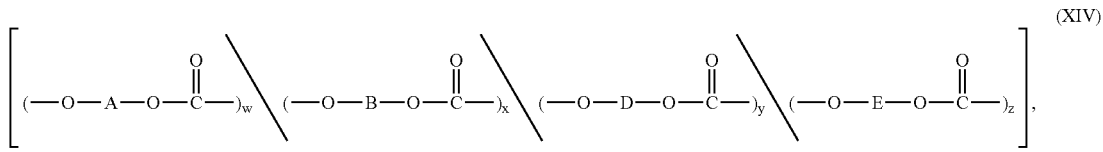

where the molar ratio w/x/y/z is from about 1 to 20/from about 1 to 5/from about 0 to 10/from about 0 to 10. Particular preference is given to a molar ratio w/x/y/z of from about 1 to 5/from about 1 to 2/from about 0 to 5/from about 0 to 5.

In the formula XIV,

A is a mesogenic group of the formula

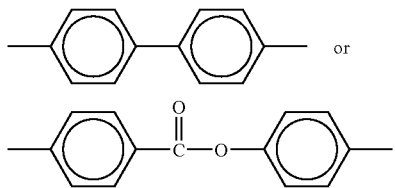

B is a chiral group of the formula

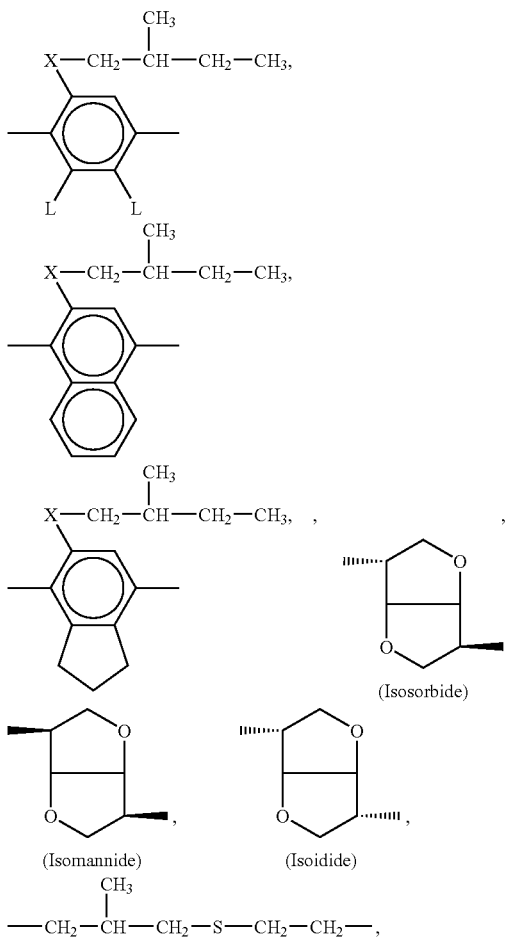

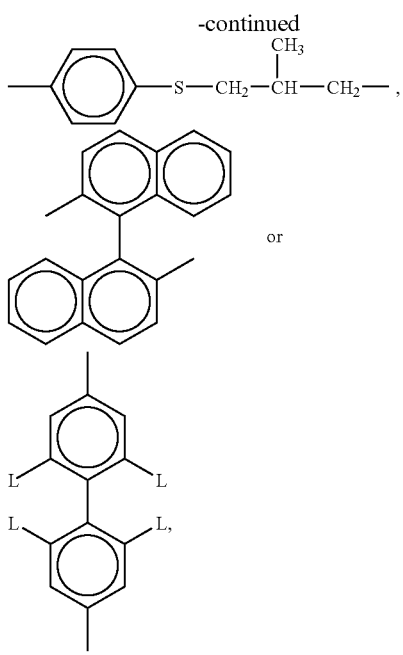

D is a photoreactive group of the formula

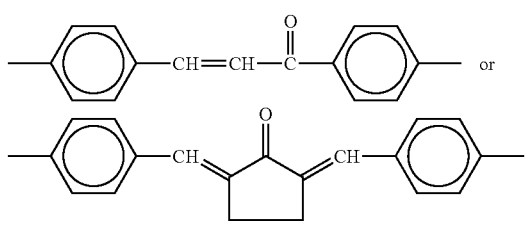

and

E is a further, non-chiral group of the formula

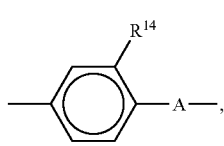

where, in the above formulae

L is alkyl, alkoxy, halogen, $COOR^{15}$, $OCOR^{15}$, $CONHR^{15}$ or $NHCOR^{15}$, X is S, O, N, $CH_2$ or a single bond, $R^{15}$ is alkyl or hydrogen, A is a single bond, $(CH_2)_n$, $O(CH_2)_n$, $S(CH_2)_n$, $NR(CH_2)_n$,

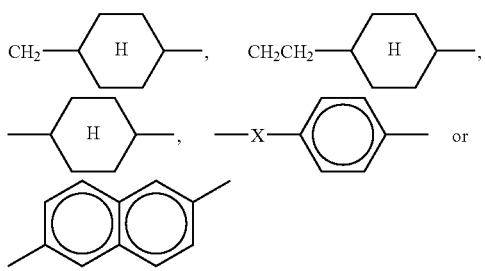

$R^{14}$ is hydrogen, halogen, alkyl or phenyl, and n is an integer from 1 to 15.

If $R^{14}$ is alkyl or halogen and A is a single bond, or if $R^{14}$ is H or alkyl and A is

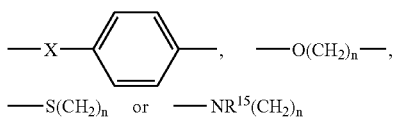

the groups are solubility-improving groups. Examples thereof are

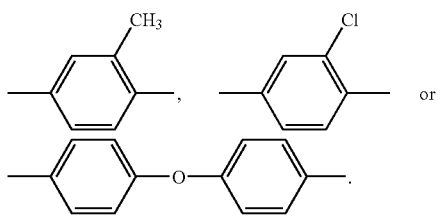

The preferred chiral component is isosorbide, isomannide and/or isoidide.

The proportion of the chiral diol structural units is preferably within the range from 1 to 80 mol % of the total content of diol structural units, particularly preferably in the range from 2 to 20 mol %, depending on the desired reflection behavior.

Alternatively, a cholesteric polymer in a polymerizable diluent (group d)) can be used as component B.

Examples of preferred polymers of group d) are crosslinkable cholesteric copolyisocyanates as described in U.S. Pat. No. 08/834,745, the full content of which is incorporated herein by reference. Such copolyisocyanates have repeating units of the formulae

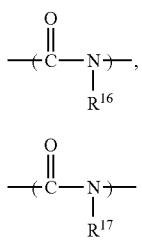

(XV)

(XVI)

and, if appropriate, of the formula

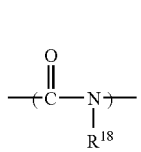

(XVII)

where
$R^{16}$ is a chiral aliphatic or aromatic radical,
$R^{17}$ is a crosslinkable radical, and
$R^{18}$ is an achiral radical.

Unless specified otherwise, alkyl (including meanings such as alkoxy, dialkyl, alkylthio etc.) means a branched or unbranched $C_1$-$C_{12}$-alkyl, preferably $C_3$-$C_{12}$-alkyl, particularly preferably $C_4$-$C_{10}$-alkyl, in particular $C_6$-$C_{10}$-alkyl.

$R^{16}$ is preferably selected from (chiral) branched or unbranched alkyl, alkoxyalkyl, alkylthioalkyl, cycloalkyl, alkylphenyl or $C_3$-$C_9$-epoxyalkyl radicals or radicals of esters of $C_1$-$C_6$-fatty acids with $C_1$-$C_6$-alkanols or $C_3$-$C_9$-dialkylketones. The ester radical can be attached to the nitrogen either via the fatty acid component or via the alkanol radical. The radical $R^{16}$ can contain 1, 2 or 3 substituents which are identical or different and are selected from the group consisting of alkoxy groups, di-$C_1$-$C_4$-alkylamino groups, CN, halogen atoms or $C_1$-$C_4$-alkylthio groups.

$R^{16}$ is preferably selected from alkyl, alkoxyalkyl, residues of esters of $C_1$-$C_6$-fatty acids with $C_1$-$C_6$-alkanols, $C_3$-$C_9$-dialkylketones and epoxidized $C_3$-$C_9$-epoxyalkyl radicals, where $R^{16}$ may be substituted by 1 or 2 radicals which are identical or different and are selected from the group consisting of alkoxy, halogen, CN or $CF_3$. Preferred substituents of branched or unbranched alkyl or alkoxy radicals are selected from the group consisting of alkoxy groups, halogen atoms or CN; for esters of $C_1$-$C_6$-fatty acids with $C_1$-$C_6$-alkanols from the group consisting of alkoxy groups, halogen atoms, CN or $CF_3$, and for $C_3$-$C_9$-dialkylketones from the group consisting of alkoxy groups, halogen atoms or CN.

In particular, the main chain of the radical $R^{16}$ has a length of from 3 to 12, especially from 6 to 10, preferably from 6 to 8, members (carbon, oxygen and/or sulfur atoms). Particular preference is given to radicals $R^{16}$ selected from the group consisting of

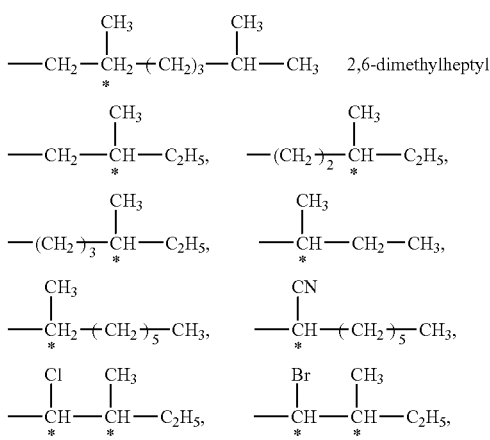

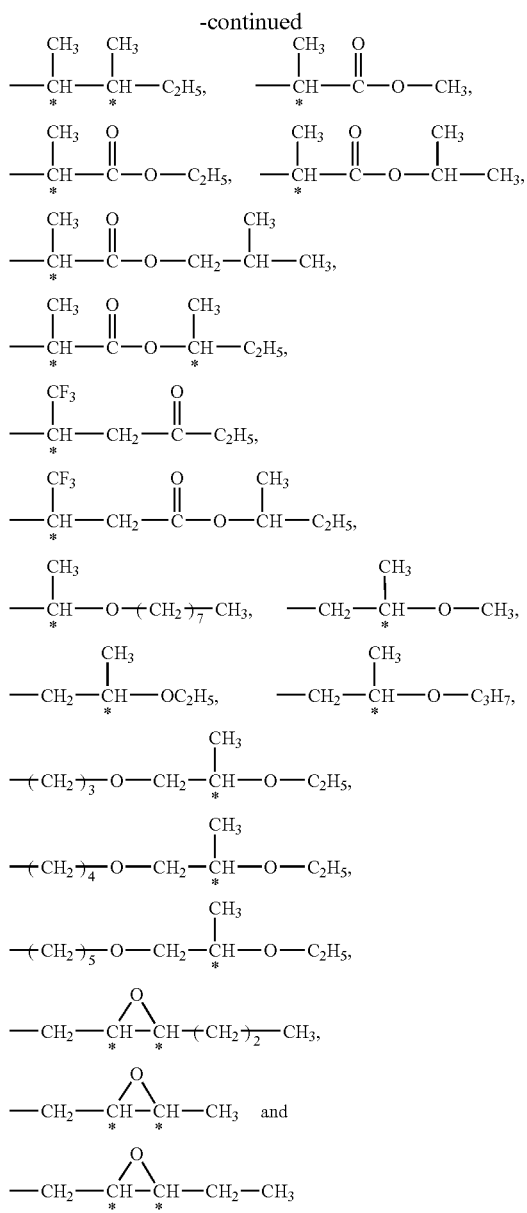

With very particular preference, component XV of the suitable copolyisocyanates is derived from 2,6-dimethylheptylisocyanate.

The radical $R^{17}$ of the suitable copolyisocyanates is preferably selected from the group consisting of $C_3$-$C_{11}$-alkenyl radicals, $C_4$-$C_{11}$-vinylether radicals (=vinyl-$C_2$-$C_9$-alkyl ethers), ethylenically unsaturated $C_3$-$C_{11}$-carboxylic acid radicals and esters of ethylenically unsaturated $C_3$-$C_6$-monocarboxylic acids with $C_2$-$C_6$-alkanols, where the bond to the nitrogen atom is via the alkanol radical of the ester. Particularly preferably, the radical is selected from the group consisting of methyl acrylate, ethyl acrylate, propyl acrylate, n-butyl acrylate, isobutyl acrylate, 2-ethylhexyl acrylate, methyl methacrylate, ethyl methacrylate, propyl methacrylate, n-butyl methacrylate, isobutyl methacrylate, 2-ethylhexyl methacrylate, in particular from the group consisting of ethyl acrylate and ethyl methacrylate.

The radical $R^{18}$ is preferably as defined for $R^{16}$. However, it is achiral, i.e. it has no center of chirality or is present as a racemic mixture.

Particularly preferably, the main chain of the radical $R^{18}$ has a length of from 4 to 12, in particular from 6 to 10, preferably 6 to 8, members (carbon, oxygen and/or sulfur atoms). With very particular preference, component XVII of the copolyisocyanates of the invention is derived from n-hexyl isocyanate, n-heptyl isocyanate or n-octyl isocyanate.

Components XV, XVI and XVII are preferably present in a molar ratio XV:XVI:XVII of from about 1 to 20:1 to 20:50 to 98, in particular from about 5 to 15:5 to 15:65 to 90, particularly preferably about 15:10:75.

The units XV, XVI and XVII can be randomly distributed in the suitable copolyisocyanates.

A preferred component B of the composition of the invention is a mixture of at least one achiral nematic polymerizable monomer and a chiral polymerizable monomer, i.e. group a).

The compound(s) A is/are preferably present in an amount of from 0.01 to 20% by weight, particularly preferably from 0.01 to 15% by weight, very particularly preferably from 0.01 to 10% by weight, in particular from 0.01 to 7% by weight, especially from 0.01 to 5% by weight, based on the total weight of component B.

The composition is preferably either an intimate mixture of components A and B or a solution or dispersion of components A and B in a suitable diluent. The proportion of diluent is preferably from 5 to 95% by weight, particularly preferably from 30 to 80% by weight, in particular from 40 to 70% by weight, based on the total weight of the composition.

Suitable diluents for the compounds of groups a) or b) are linear or branched esters, in particular acetic esters, cyclic ethers and esters, alcohols, lactones, aliphatic and aromatic hydrocarbons, such as toluene, xylene and cyclohexane, and ketones, amides, N-alkylpyrrolidones, in particular N-methylpyrrolidone, and especially tetrahydrofuran (THF), dioxane and methyl ethyl ketone (MEK).

Examples of suitable diluents for the polymers of group c) are ethers and cyclic ethers, such as tetrahydrofuran or dioxane, chlorinated hydrocarbons, such as dichloromethane, trichloromethane, carbon tetrachloride, dichloroethane, 1,1,2,2-tetrachloroethane, 1-chloronaphthalene, chlorobenzene or 1,2-dichlorobenzene. These diluents are particularly suitable for polyesters and polycarbonates. Examples of suitable diluents for cellulose derivatives are ethers, such as dioxane, or ketones, such as acetone. When copolyisocyanates are used as polymers of group d), it is advisable to use polymerizable diluents as described in U.S. Ser. No. 08 834 745. Examples of such polymerizable diluents are esters of α,β-unsaturated mono- or dicarboxylic acids, in particular $C_3$-$C_6$-mono- or dicarboxylic acids, with $C_1$-$C_{12}$-alkanols, $C_2$-$C_{12}$-alkanediols or their $C_1$-$C_6$-alkyl ethers and phenyl ethers, for example acrylates and methacrylates, hydroxyethyl or hydroxypropyl acrylate or methacrylate and 2-ethoxyethyl acrylate or methacrylate;

vinyl-$C_1$-$C_{12}$-alkyl ethers, such as vinylethyl, vinylhexyl or vinyloctyl ether;

vinyl esters of $C_1$-$C_{12}$-carboxylic acids, such as vinyl acetate, vinyl propionate, vinyl laurate;

$C_3$-$C_9$-epoxides, such as 1,2-butylene oxide, styrene oxide;

N-vinylpyrrolidone, N-vinylcaprolactam, N-vinylformamide;

vinylaromatic compounds, such as styrene, α-methylstyrene, chlorostyrene, and compounds having two or more crosslinkable groups, such as diesters of diols (including polyethylene glycols) with acrylic or methacrylic acids or divinylbenzene.

Examples of preferred polymerizable diluents are 2-ethoxyethyl acrylate, diethylene glycol diacrylate, ethylene glycol dimethacrylate, diethylene glycol dimethacrylate, triethylene glycol dimethacrylate, diethylene glycol monomethyl ether acrylate, phenoxyethyl acrylate and tetraethylene glycol dimethacrylate. A particularly preferred polymerizable diluent is styrene.

The mixtures of groups a), b) or c) may also include polymerizable diluents in small amounts. Preferred polymerizable solvents which can be added to a), b) or c) are acrylates, in particular acrylates of relatively high functionality, such as bis-, tris- or tetraacrylates, and particularly preferably high-boiling oligoacrylates. The preferred amount added is approximately 5% by weight, based on the total weight of the mixture.

In order to adjust the viscosity and the leveling behavior, the composition of the invention can be mixed with additional components.

For example, it is possible to employ polymeric binders and/or monomeric compounds which can be converted into a polymeric binder by polymerization. Examples of such compounds are organic-solvent-soluble polyesters, cellulose esters, polyurethanes, silicones and polyether- or polyester-modified silicones. Particular preference is given to using cellulose esters such as cellulose acetobutyrate.

The addition of small amounts of suitable leveling agents may also be advantageous. It is possible to employ from about about 0.005 to 1% by weight, in particular from 0.01 to 0.5% by weight, based on the amount of cholester employed. Examples of suitable leveling agents are glycols, silicone oils and in particular acrylate polymers, such as the acrylate copolymers Byk 361 or Byk 358 from Byk-Chemie and the modified, silicone-free acrylate polymers Tego flow ZFS 460 from Tego.

The composition may also include UV and weathering stabilizers. Examples of such additives are derivatives of 2,4-dihydroxybenzophenone, derivatives of 2-cyano-3,3-diphenyl acrylates, derivatives of 2,2',4,4'-tetrahydroxybenzophenone, derivatives of ortho-hydroxyphenylbenzotriazole, salicylic esters, ortho-hydroxyphenyl-s-triazines or sterically hindered amines. These substances can be employed alone or preferably as mixtures.

If the composition of the invention is to be subjected to photochemical polymerization, it may also include customary photoinitiators. For curing by electron beams, such initiators are not required. Examples of suitable photoinitiators are isobutyl benzoin ether, 2,4,6-trimethylbenzoyl diphenyl phosphine oxide, 1-hydroxycyclohexyl phenyl ketone, 2-benzyl-2-dimethylamino-1-(4-morpholinophenyl)-furan-1-one, mixtures of benzophenone and 1-Hydroxycyclohexyl phenyl ketone, 2,2-dimethoxy-2-phenylacetophenone, perfluorinated diphenyltitanocenes, 2-methyl-1-(4-[methylthio]phenyl)-2-(4-morpholinyl)-1-propanone, 2-hydroxy-2-methyl-1-phenylpropan-1-one, 4-(2-hydroxyethoxy)phenyl-2-hydroxy-2-propylketone, 2,2-diethoxyacetophenone, 4-benzoyl-4'-methyldiphenyl sulfide, ethyl 4-(dimethylamino)benzoate, mixtures of 2-isopropyl thioxanthone and 4-isopropylthioxanthone, 2-(dimethylamino) ethyl benzoate, d,l-campherquinone, ethyl-d,l-campherquinone, mixtures of benzophenone and 4-methylbenzophenone, benzophenone, 4,4'-bisdimethylamine-benzophenone, ($\eta^5$-cyclopentadienyl) ($\eta^6$-isopropylphenyl)iron(II) hexafluorophosphate, triphenylsulfonium hexafluorophosphate or mixtures of triphenylsulfonium salts, and butanediol diacrylate, dipropylene glycol diacrylate, hexanediol diacrylate, 4-(1,1-dimethylethyl)cyclohexyl acrylate, trimethylolpropane triacrylate and tripropylene glycol diacrylate.

The present invention provides use of a composition as described above for producing a heat-insulating coating.

The present invention furthermore provides a heat-insulating coating comprising at least one oriented, cured layer of the composition of the invention.

The heat-insulating coating of the invention preferably comprises at least one IR-reflecting, cured cholesteric polymer which has a helical superstructure which corresponds to a wavelength in the IR spectral range.

The cholesteric polymer can be obtained, for example, by orienting and curing a component B from group a), b), c) or d) as described above.

When the heat-insulating coating comprises at least two layers, the IR-reflecting polymers in the different layers preferably each have different helical superstructure pitches which correspond to wavelengths in the IR spectral range, and/or opposite chiralities (handedness). In a heat-insulating coating comprising at least two layers, it is also preferred that the helical superstructure pitch of 2, preferably adjacent, layers in each case is identical, but their chirality is different. In a heat-insulating coating comprising at least two layers, it is likewise preferred that a medium is present between layers having an identical helical superstructure pitch and identical chirality which medium reverses the direction of rotation of the transmitted circularly polarized light, in particular what is known as a $\lambda/2$ film or plate.

The heat-insulating coating preferably comprises from 1 to 10 layers, particularly preferably from 1 to 4 layers, especially 2 layers. The two layers preferably differ in helical superstructure pitch or in chirality. It is particularly preferred that the two layers have an identical helical superstructure pitch, but opposite chiralities.

The present invention furthermore provides a process for producing the heat-insulating coating of the invention, which comprises applying to a substrate a composition of the invention and, if desired, orienting said composition and curing said composition. Curing is preferably carried out by polymerizing the monomers of group a) or b) or the solvent of group d) or by crosslinking of the polymer of group c).

Additional layers are produced by repeating the procedure of applying, orienting and curing, preferably using a composition of the invention which is different from the first composition, so that the oriented cholesteric polymers obtainable by polymerizing the monomers of group a) or group b) or the oriented cholesteric polymers of group c) or d) in different layers have another helical superstructure pitch and/or opposite chirality to those of the first layer. Alternatively or in addition, it is possible to introduce a medium between two layers having an identical helical superstructure pitch and identical chirality, which medium reverses the direction of rotation of the transmitted circularly polarized light, in particular what is known as a $\lambda/2$ film or plate.

What was said above with respect to the preferred compositions and heat-insulating coatings applies accordingly.

The substrate is preferably transparent. The transparent substrate may be, for example, a glass brick, a window pane, an automobile pane or a film which is to be bonded adhesively to glass for insulation purposes.

The cholesteric IR-reflecting layer can be applied to the substrate by customary techniques, for example by means of techniques selected from floating knife coating, bar coating, air-knife coating, squeeze coating, impregnating, reverse roll coating, transfer roll coating, gravure coating, kiss coating, casting, spraying, spin coating or printing techniques, such as letter press, flexographic, intaglio, offset or screen printing.

Prior to the application of the composition of the invention to the substrate, it can be diluted with any suitable diluent. Suitable diluents are the abovementioned ones.

The IR-reflecting layer(s) applied can be cured thermally, photochemically or by beam of electrons.

Curing must of course take place in the cholesteric phase and with retention of the cholesteric phase.

Where two or more layers are applied, they can in each case be applied, oriented, if desired, dried, if desired, and cured individually. However, it is likewise possible to apply two or more, or all, of the layers to be applied in one application procedure wet-in-wet to the article that is to be coated, to carry out conjoint drying if desired and then to carry out conjoint curing. A prerequisite for the simultaneous application of the cholesteric layers, however, is that there is no interdiffusion between different layers having a different reflection behavior.

Casting techniques are particularly suitable for the simultaneous application of cholesteric layers, especially knife or bar casting techniques, cast-film extrusion or stripper casting techniques, and the cascade casting process. These casting techniques are described, for example, in DE-A-19 504 930, EP-A-431 630, DE-A-3 733 031 and EP-A-452 959, which are incorporated herein by reference.

The composition of the invention is particularly suitable for producing printed insulated windows or heat-insulating transparent construction materials, or for insulating residential, office or industrial buildings against thermal radiation. In addition, the composition of the invention is also particularly suitable for use in the automotive sector, in particular for producing heat-insulating printed glass panes. The present invention therefore also provides articles having thereon a heat-insulating coating of the invention.

Owing to the presence of compound A, the heat-insulating coating of the invention has a tint, preferably a bluish or greenish tint. In addition, compound A advantageously absorbs IR radiation, so that the heat-insulating properties of the coating are enhanced, as unreflected IR radiation is absorbed and not transmitted.

The heat-insulating coating of the invention exhibits a light transmission in the wavelength range from 350 to 750 nm, as determined in accordance with ISO 9050 of at least 70%, preferably at least 72%.

The examples which follow illustrate the invention without limiting it.

EXAMPLE

A compound of the formula X was used as a nematic achiral polymerizable monomer.

A compound of the formula XI was used as chiral polymerizable monomer.

Compound A used as a compound of the formula I in which P is a quaterrylimide of the formula II which is symmetrically substituted at the quaterrylene framework with 6 tert-alkylphenoxy radicals (n=6) and bears no halogen substituents (m=0) and wherein $R^2$ is alkyl-substituted phenyl. This compound is subsequently referred to as Ia.

The solvent used was tetrahydrofuran (THF).

A mixture of the compounds X, XI and Ia, the leveling agent Byk 361 (10% strength; Byk Chemie) and the photoinitiator Irgacure 184 from Ciba in the concentrations listed in table 1 in 10 g of THF was applied to a PET film with a doctor blade in the wet film thicknesses listed in table 1. Upon evaporation of the solvent at about 85° C. a homogeneous, transparent, green-tinted layer formed. This layer was cured by means of a UV lamp.

TABLE 1

| Example | Amount (X) [g] | Amount (XI) [g] | Amount (Ia) [g] | Amount (Byk 361) [g] | Amount (Irgacure) [g] |
|---|---|---|---|---|---|
| A | 1.5 | — | 0.15 | 0.5 | 0.2 |
| B | 4.5 | — | 0.45 | 0.5 | 0.2 |
| C | 4.5 | 0.245 | 0.45 | 0.5 | 0.2 |

Visual evaluation gave the results shown in table 2.

TABLE 2

| Example | Layer thickness [µm] | Visual evaluation |
|---|---|---|
| A | 4.0 | transparent |
|   | 5.5 | transparent |
|   | 7.0 | slight haziness |
| B | 3.8 | hazy |
|   | 5.8 | increasing haziness |
|   | 7.1 | increasing haziness |
| C | 3.5 | transparent |
|   | 5.3 | transparent |
|   | 6.6 | transparent |

The visual evaluation was verified by transmission measurements in accordance with ISO 9050 in the experiments B and C. The results are summarized in table 3 below.

TABLE 3

| Example | Layer thickness [µm] | $T_{vis}$ [%] | $T_{sol}$ [%] |
|---|---|---|---|
| B | 3.8 | 59.2 | 51.6 |
| C | 3.5 | 72.8 | 38.8 |

$T_{vis}$ = transmission in the wavelength range from 350 to 750 nm
$T_{sol}$ = transmission in the wavelength range from 350 to 2500 nm Desired values in accordance with ISO 9050:
$T_{vis}$>70%
$T_{sol}$<40%

We claim:
1. A composition comprising
   i) at least one radiation-absorbing tert-alkylphenoxy-substituted polycyclic compound A of formula I

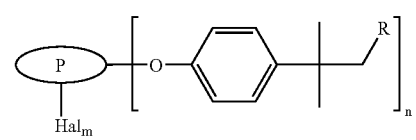

I where
   P is a conjugated polycyclic radical that is stable to bases and nucleophiles, optionally bears aryl substituents and contains no group from the group consisting of —CO—NH—CO—, —COOH and —CO—O—CO—;

R is $C_1$-$C_8$-alkyl, wherein the carbon chain of said $C_1$-$C_8$-alkyl may be interrupted by one or more groups selected from the group consisting of —O—, —S—, —$NR^{1-}$, —CO— and —$SO_2$— and which may be monosubstituted or polysubstituted by identical or different radicals selected from the group consisting of $C_1$-$C_6$-alkoxy and a 5- to 7-membered heterocyclic radical that is attached via a nitrogen atom and may contain further heteroatoms and/or may be aromatic; or R is $C_5$-$C_8$-cycloalkyl, wherein the carbon framework of said $C_5$-$C_8$-cycloalkyl may be interrupted by one or more groups selected from the group consisting of —O—, —S—, —$NR^{1-}$, —CO— and —$SO_2$— and which may be monosubstituted or polysubstituted by $C_1$-$C_6$-alkyl;

$R^1$ is hydrogen or $C_1$-$C_6$-alkyl;

Hal is chlorine or bromine or mixtures thereof;

m is from 0 to 15; and n is from 1 to 16, wherein the sum m+n is ≦16 and ii) at least one curable IR-reflecting component B which comprises
 a) at least one achiral nematic polymerizable monomer and at least one chiral polymerizable monomer;
 b) at least one cholesteric polymerizable monomer;
 c) at least one cholesteric crosslinkable polymer; or
 d) at least one cholesteric polymer in a polymerizable diluent.

2. A composition as claimed in claim 1, wherein said P in said compound A of formula I is a base-stable radical selected from the group consisting of naphthalenes, anthracenes, phenanthrenes, tetracenes, perylenes, terrylenes, quaterrylenes, pentarylenes, hexarylenes, anthraquinones, indanthrones, N-substituted naphthalene-1,8-dicarboxylic monoimides, N,N'-disubstituted naphthalene-1,8:4,5-tetracarboxylic diimides, N-substituted perylene-3,4-dicarboxylic monoimides, N,N'-disubstituted perylene-3,4:9,10-tetracarboxylic diimides, N,N'-disubstituted terrylene-3,4:11,12-tetracarboxylic diimides, N,N'-disubstituted quaterrylene-3,4:13,14-tetracarboxylic diimides, acridines, carbazoles, dibenzofurans, dinaphthofurans, benzimidazoles, benzothiazoles, phenazines, dioxazines, quinacridones, metal phthalocyanines, metal naphthalocyanines, metal porphyrins, cumarins, dibenzofuranones, dinaphthofuranones, benzimidazolones, indigo compounds, thioindigo compounds, quinophthalones, naphthoquinophthalones and diketopyrrolopyrroles.

3. The composition as claimed in claim 1, which comprises from 0.01 to 20% by weight of said compound A, based on the total weight of said component B.

4. The composition as claimed in claim 1, wherein said component B comprises at least one achiral nematic polymerizable monomer and at least one chiral polymerizable monomer.

5. The composition as claimed in claim 1, further comprising at least one auxiliary selected from the group consisting of photoinitiators, binders, leveling agents, UV stabilizers, weathering stabilizers, and mixtures thereof.

6. A heat-insulating coating comprising at least one oriented, cured layer of said composition as claimed in claim 1.

7. A heat-insulating coating as claimed in claim 6, which comprises at least one oriented, IR-reflecting, cured cholesteric polymer that has a helical superstructures pitch that corresponds to a wavelength in the IR spectral range, the cured cholesteric polymer obtained from component B.

8. A heat-insulating coating as claimed in claim 7, which comprises at least two layers, wherein said at least two layers each comprise an IR-reflecting polymer having different helical superstructures pitches that correspond to wavelengths in the IR spectral range, or opposite chiralities; or different helical superstructures pitches that correspond to wavelengths in the IR spectral range and opposite chiralities.

9. A process for producing a heat-insulating coating as claimed in claim 6, which comprises applying to a substrate a composition comprising
 i) at least one radiation-absorbing tert-alkylphenoxy-substituted polycyclic compound A of formula I

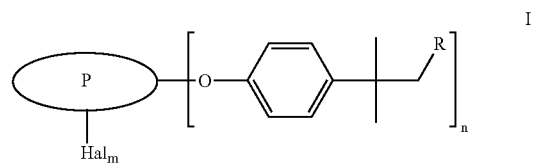

where
 P is a conjugated polycyclic radical that is stable to bases and nucleophiles, optionally bears aryl substituents and contains no group from the group consisting of —CO—NH—CO—, —COOH and —CO—O—CO—;
 R is $C_1$-$C_8$-alkyl, wherein the carbon chain of said $C_1$-$C_8$-alkyl may be interrupted by one or more groups selected from the group consisting of —O—, —S—, —$NR^{1-}$, —CO—and —$SO_2$— and which may be monosubstituted or polysubstituted by identical or different radicals selected from the group consisting of $C_1$-$C_6$-alkoxy and a 5- to 7-membered heterocyclic radical that is attached via a nitrogen atom and may contain further heteroatoms and/or may be aromatic; or R is $C_5$-$C_8$-cycloalkyl, wherein the carbon framework of said $C_5$-$C_8$-cycloalkyl may be interrupted by one or more groups selected from the group consisting of —O—, —S—, —$NR^{1-}$, —CO— and —$SO_2$— and which may be monosubstituted or polysubstituted by $C_1$-$C_6$-alkyl;

$R^1$ is hydrogen or $C_1$-$C_6$-alkyl;

Hal is chlorine or bromine or mixtures thereof;

m is from 0 to 15; and n is from 1 to 16, wherein the sum m+n is ≦16 and ii) at least one curable IR-reflecting component B which comprises
 a) at least one achiral nematic polymerizable monomer and at least one chiral polymerizable monomer;
 b) at least one cholesteric polymerizable monomer;
 c) at least one cholesteric crosslinkable polymer; or
 d) at least one cholesteric polymer in a polymerizable diluent, and and curing said composition, where before curing said composition optionally may be oriented.

10. A process as claimed in claim 9, wherein said curing is carried out by polymerizing said at least one achiral nematic polymerizable monomer and at least one chiral polymerizable monomer; or said at least one cholesteric polymerizable monomer; or said polymerizable diluent, or crosslinking said at least one cholesteric crosslinkable polymer.

11. An article comprising a heat-insulating coating as claimed in claim 6.

* * * * *